May 2, 1933.  J. W. HEINEY  1,906,585
FRONT WHEEL BRAKE CONSTRUCTION
Filed Feb. 2, 1931  2 Sheets-Sheet 1

INVENTOR
John W. Heiney,
BY Redding, Greeley, O'Shea & Campbell
HIS ATTORNEYS

May 2, 1933.  J. W. HEINEY  1,906,585
FRONT WHEEL BRAKE CONSTRUCTION
Filed Feb. 2, 1931  2 Sheets-Sheet 2
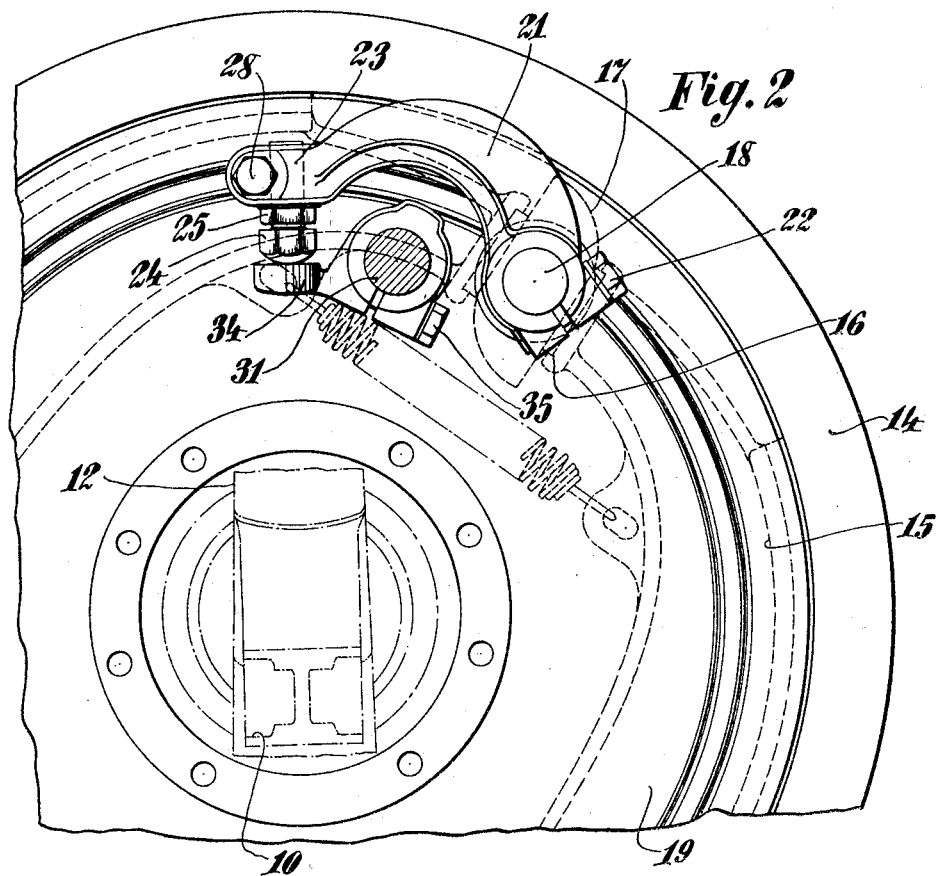
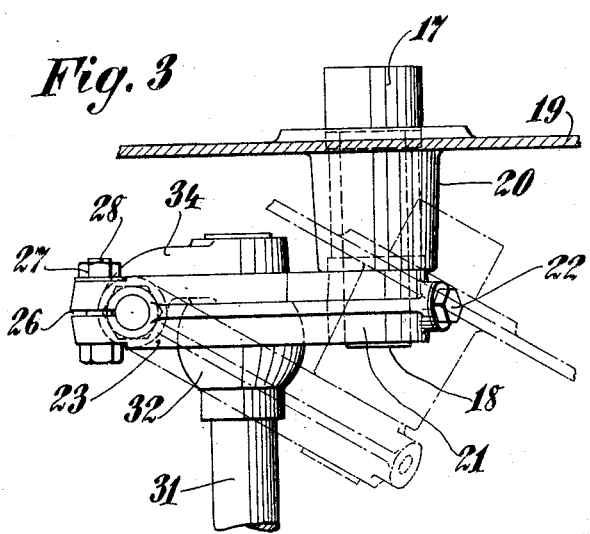
INVENTOR
John W. Heiney,
BY Redding, Greely, O'Shea & Campbell
HIS ATTORNEYS Patented May 2, 1933

1,906,585

UNITED STATES PATENT OFFICE

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE

FRONT WHEEL BRAKE CONSTRUCTION

Application filed February 2, 1931. Serial No. 512,811.

The present invention relates to brake mechanism for dirigible wheels and embodies, more specifically, an improved brake actuating mechanism for dirigible wheels whereby turning of the wheel with respect to the operating mechanism does not affect the relative positions of the elements.

A common difficulty in front wheel brake structures is the fact that turning of the wheel automatically causes the partial actuation of the brakes, due to the wheel turning upon an axis different from the axis of the brake operating mechanism. Numerous attempts have been made to overcome this difficulty but none has provided a successful mechanism for accomplishing the above result, which is readily manufactured and installed, as well as easily serviced. The present invention therefore contemplates the provision of a brake operating mechanism for dirigible wheels, wherein the elements are so constructed as to maintain a predetermined relationship therebetween regardless of the turning movement of the wheel.

A further object of the invention is to provide a brake operating mechanism of the above character, wherein the parts are simple of construction and readily manufactured and installed, furthermore being of such nature as to be readily serviced during operation of the vehicle.

A further object of the invention is to provide a brake operating mechanism, wherein the power transmitting elements mounted on the wheel and the relatively stationary portion of the vehicle move in such fashion that the contacting portions thereof lie substantially in the axis of turning of the wheels.

Further objects, not specifically enumerated above, will be apparent as the invention is described in greater detail in connection with the accompanying drawings, wherein:

Figure 2 is a view in side elevation, looking from the right in Figure 1, and showing the axle and wheel mounting elements removed in the interest of clearness.

Figure 3 is a detail plan view showing the operating mechanism of Figure 2.

Figure 1:
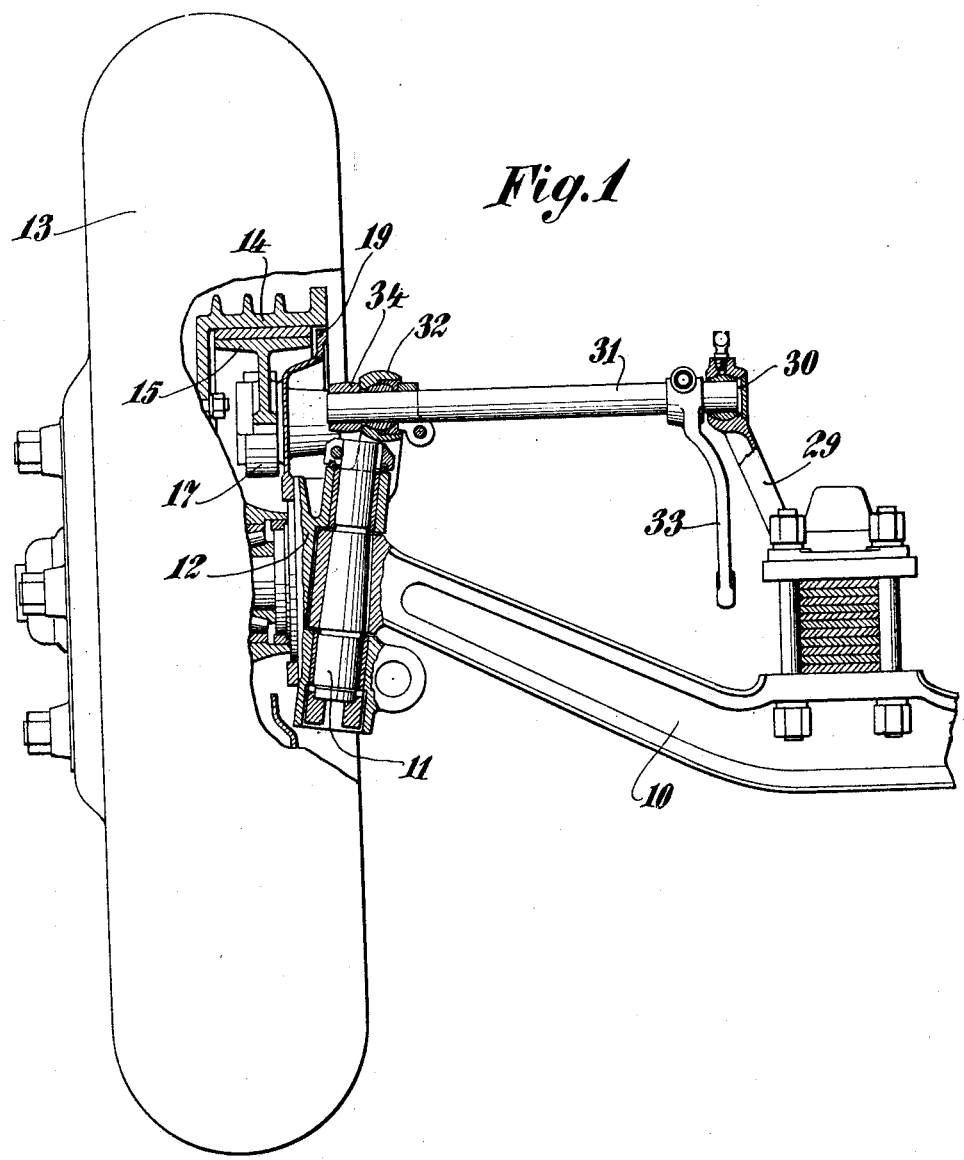
Figure 1 is a view in front elevation partly broken away and in section showing the brake operating mechanism of the present invention.

Referring to the above drawings, a front axle is shown at 10 having a spindle 11 upon which a knuckle 12 is mounted. A dirigible wheel 13 is mounted upon the knuckle 12 in the usual manner and carries a brake drum 14. Brake shoes 15 cooperate with the brake drum in a well known fashion and are formed with actuating faces 16 against which cam 17 engages. This cam is formed with opposite faces to engage the shoes simultaneously upon rotation thereof and a shaft 18 mounts the cam and transmits turning motion thereto.

Upon the dust cover 19 of the brake mechanism a bushing 20 is formed, this bushing journaling the shaft 18 as clearly seen in Figure 3. Upon the shaft 18 is a lever 21 which is secured to the shaft by means of a bolt 22 and is preferably curved as shown in Figure 2. The outer extremity 23 of the lever carries a contact member 24 which is adjustably positioned and secured in a desired position by means of a lock nut 25. The extremity 23 is split at 26 and nut 27 and bolt 28 secure the threaded contact member 24 in a desired fashion, thus cooperating with the lock nut 25. The curvature of the lever 21 is such that the contacting face of the bearing member 24 moves in an arc which is substantially tangent to the axis of the spindle.

Upon the front axle 10 or the spring carried thereby is a bracket 29 having a ball socket 30 which mounts one end of shaft 31 with provision for universal movement with respect to the end of the bracket. The other end of shaft 31 is mounted in a similar mounting carried upon a bracket arm 32 which is mounted on the knuckle spindle 11. An arm 33 is secured to the shaft 30 and actuates the same to effect the actuation of the brake mechanism through lever 21. The motion of shaft 31 is transmitted to lever 21 by a crank arm 34 which is secured to the end of shaft 31 by means of a bolt 35. Rotation of the shaft 31 in the proper direction moves the arm 34 in a clockwise direction, as viewed in Figure 2, and elevates the bearing member 24 carried by the lever 21.

It will thus be seen that the point of contact between the arm 34 and bearing member 24 moves substantially in the axis of the king pin and turning movement of the wheel about such axis has practically no effect upon the brake mechanism. The only time that such turning does effect the brake mechanism is when the arm 34 and lever 21 have been moved to an extreme clockwise position in applying the brakes. Even under this condition, the effect is so slight as to be negligible.

While the invention has been described with specific reference to the accompanying drawings, it is not to be limited, save as defined in the appended claim.

I claim as my invention:

1. In combination with a dirigible wheel having a brake, a brake cam, a spindle mounting the wheel, a lever actuating the cam, a bearing member on the lever in the axis of the spindle, an operating shaft carried by the spindle mounting, and a curved crank on the shaft having an engaging face adapted to engage the bearing members, the axis of the shaft and lever lying on the same side of the spindle, and the axes of the crank, lever and point of contact between the bearing member and crank lying in substantially the same plane.

This specification signed this 26th day of January, A. D. 1931.

JOHN W. HEINEY.